Aug. 25, 1931.  M. L. BLAIR  1,820,007

VENTILATING APPARATUS FOR DYNAMO ELECTRIC MACHINES

Filed Sept. 26, 1927

Inventor
Mark L. Blair
By Blackmore, Spencer & Hulk
Attorneys

Patented Aug. 25, 1931

1,820,007

UNITED STATES PATENT OFFICE

MARK L. BLAIR, OF FLINT, MICHIGAN, ASSIGNOR TO A C SPARK PLUG COMPANY, OF FLINT, MICHIGAN, A COMPANY OF MICHIGAN

VENTILATING APPARATUS FOR DYNAMO ELECTRIC MACHINES

Application filed September 26, 1927. Serial No. 222,136.

This invention relates to means for cooling the working parts of electric motors, generators and similar machines of the type in which the working parts are enclosed in a casing.

Ordinary atmospheric air contains varying proportions of dust and if this air is circulated through the casing and over the working parts of a motor, generator or similar machine, dust will be deposited on these parts and is likely to cause sparking, short circuits and other troubles. It is an object of this invention to provide means for circulating cooling air through the interior of the casing and over the working parts of a machine of the class described and means whereby the dirt is removed from the air before it enters the casing and comes into contact with the working parts.

More specifically, it is an object of the invention to provide, in combination with an electric machine which includes a casing and a rotatable shaft within the casing and projecting at one end therethrough, a housing associated with the casing and surrounding the projecting end of the shaft, and means associated with the housing and the shaft to remove dirt from the air and circulate the clean air through the interior of the motor casing.

It is a further object of the invention to provide improved air cleaning and/or blowing apparatus.

Other objects of the invention will appear in the course of the following description of the preferred embodiment of my invention which is shown in the accompanying drawings, in which.

Figure 1:
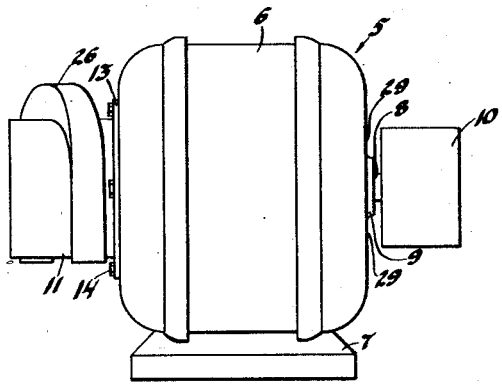
Figure 1 is a side elevation of an electric motor on which is installed air cleaning and ventilating apparatus in which is employed my invention.
Figure 2:
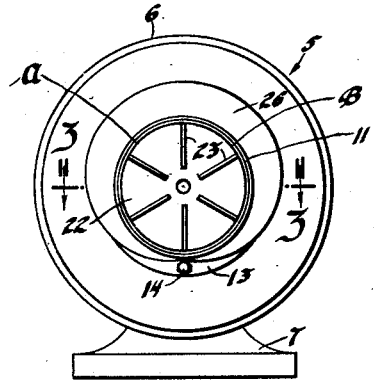
Figure 2 is an end elevation of the construction shown in Figure 1.
Figure 3:
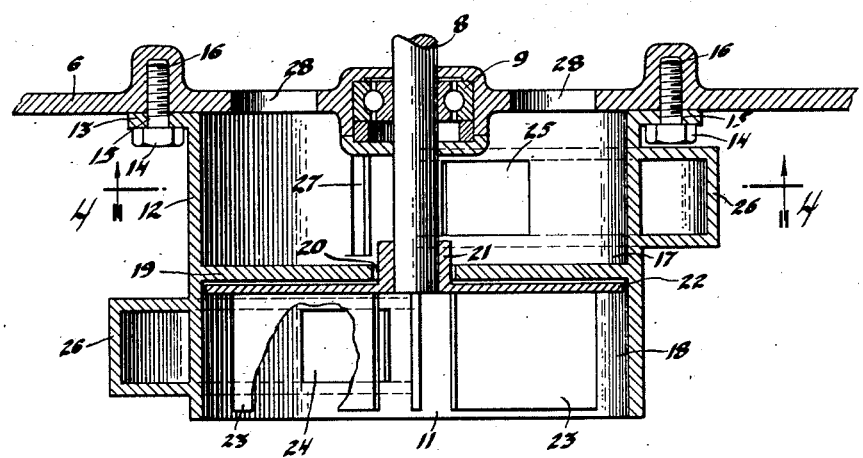
Figure 3 is an enlarged fragmentary cross section taken on the line 3—3 of Figure 2.
Figure 4:
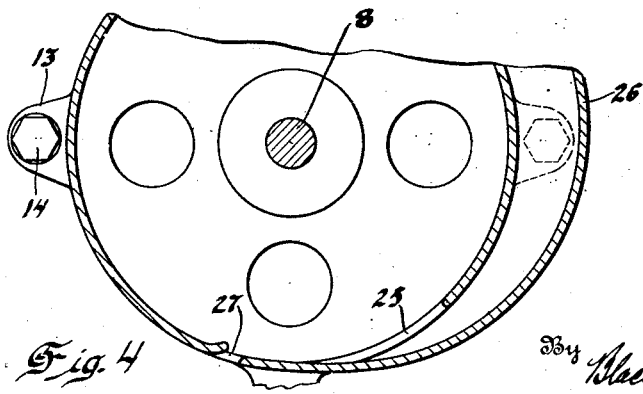
Figure 4 is a fragmentary section taken on the line 4—4 of Figure 3.

In the drawings, the reference character 5 indicates an electric motor of which the working parts are enclosed in the casing 6 which is supported by the base 7. The armature of the motor is carried by the shaft 8 which is journalled on bearings, such as 9, at opposite ends of the casing and projects therethrough at both ends. To one projecting end of the shaft is fixed an ordinary pulley 10 in any desired manner.

The reference character 11 indicates a cylindrical housing secured to the casing around and concentric with the projecting end of the shaft 8 opposite to that carrying the pulley 10. On the side wall 12 of the housing at its end adjacent the casing there is provided an outwardly extending circumferential flange 13 which bears against and is secured to the casing by screws or the like 14 extending through perforations 15 in the flange and threaded into the casing, as indicated at 16. The housing 11 is divided into two separate compartments, an inner one 17, and an outer one 18, by a circular disk 19 secured to the side wall 12 thereof in any desired manner. The disk is provided with a central perforation 20 through which projects the extremity of the shaft 8.

To the extremity of the shaft 8 is fixed so as to rotate therewith a hub 21 having its inner end projecting into the opening 20 and carrying on its outer end a circular plate 22 which is located in the outer compartment 18. To the outer surface of this plate 22 are fixed blades 23 disposed perpendicularly thereto and extending radially from the circumference toward but ending short of the center of the plate.

The outer end of the outer compartment 18 is open to the atmosphere. The side wall of the housing is provided with a rectangular opening 24 leading into the outer compartment 18 opposite the ends of the blades 23 and with a second similar opening 25 adjacent the opening 24 but leading into the inner compartment 17. A rectangular conduit 26, positioned on the outside of the wall of the housing, encircles the housing and connects the openings 24 and 25, merging tangentially into the surface of the housing beyond each opening. Starting at the opening 24, the conduit 26 extends parallel to the edge of the plate 19 and around the portion of the housing which forms the side wall of the outer compartment and gradually increases in cross sectional area up to the point A. Between the points A and B, the conduit crosses from that portion of the housing which forms the side wall of the outer compartment to that which forms the side wall of the inner compartment, remaining constant in cross sectional area between these two points. From the point B to the point beyond the opening 25 where it merges into the side wall of the housing, the conduit extends parallel to the edge of the plate 19 and around that portion of the housing which forms the side wall of the inner compartment, gradually decreasing in cross sectional area. Beyond, but adjacent, the opening 25, the side wall of the housing is provided with a tangential dirt discharge opening 27, leading from the compartment 17 to the atmosphere.

In the end of the casing carrying the housing and within the circumference of the housing, there are provided openings, such as 28, leading from the interior of the housing to the interior of the motor casing to provide for entrance of air from the housing to the casing. Similar openings, indicated at 29, are provided in the opposite end of the casing for the discharge of the air. It is preferable that the casing be air-tight at all other points to insure that the cooling air forced into the casing by the blades 23 will travel the full length of the interior of the casing and pass over all parts within the casing before being discharged therefrom. But even if there are leaks in the casing they will not serve as passages for dirty air to enter the casing for the air in the casing is under pressure due to the blades 23 and air will be discharged from the casing rather than drawn into it through the leaks.

When the motor starts, the blades 23 revolve and air is drawn into the compartment 18 through its open outer end. The blades 23 force the air, through the opening 24, into the conduit 26 and, through the conduit and the opening 25, innto the compartment 17. In passing through the conduit around the outside of the housing, the air travels in a substantially helical path and the dirt carried by the air is, consequently, thrown by centrifugal action to the outside of the current and, finally, accompanied by a little air, out of the housing through the dirt discharge opening 27. The remaining volume of clean air then passes through the openings 28 into the motor casing and passes over and cools the brushes, commutator, field coils and armature and finally passes out of the casing through the openings 29. The disk 19 and the plate 22 prevent any air passing from the compartment 18 to the compartment 17 without travelling through the conduit 26.

Though I have described my combined air cleaner and ventilator as applied to an electric motor, it is not limited to such a restricted use. That it can also be used on electric generators, rotary converters and similar machines is obvious. It can furthermore also be used in many other installations where a simple efficient air cleaner is needed.

It is not necessary that the air discharge openings in the motor casing be positioned in the end opposite to that having the intake openings. It may be desirable in some instances to position them in the sides of the casing or in both the sides and the end. If desired the dust discharge opening may be positioned in the outer wall of the conduit 26 adjacent its discharge end.

If desired packing may be positioned between the plate 19 and the hub 21 to make the connection air-tight. But this is not necessary as very little if any air will leak through the small space between the two parts due to the plate 22.

I claim:

1. For use with a machine having a casing and a rotatable shaft within said casing and projecting therethrough at one end, a housing around the projecting end of the shaft, means dividing said housing into an inner compartment communicating with the interior of the casing and an outer compartment communicating with the atmosphere and means providing an air passage between the two compartments, and a fan on the shaft and in the outer compartment to cause circulation of air through the housing and the casing.

2. The invention claimed in claim 1 in which the second means is a curved conduit adapted to centrifugally separate foreign matter from the air passing therethrough.

3. The invention claimed in claim 1 in which the second means is a curved conduit on the outside of and partially encircling the housing.

4. For use in an electric machine having a casing and a rotatable shaft within the casing and projecting therethrough at one end, a housing around the projecting end of the shaft, means dividing said housing into an inner compartment communicating with the interior of the casing and an outer compartment communicating with the atmosphere, and means including rotary blades in the outer compartment to cause separation of foreign matter from the air, the discharge of the dirt from the housing and the circulation of the cleaned air through the casing.

5. For use in an electric machine having a casing and a rotatable shaft within the casing and projecting therethrough at one end, a housing around the projecting end of the shaft, means dividing the housing into an inner compartment communicating with the interior of the casing and an outer compartment communicating with the atmosphere, a curved conduit opening tangentially into both of the compartments and means on the shaft and in the outer compartment to cause circulation of air through the conduit and through the casing.

6. For use in an electric machine which includes a casing and a rotatable shaft within the casing and projecting therethrough at one end, means to clean air and to circulate the cleaned air through the interior of the casing including, a housing surrounding the projecting end of the shaft, means dividing the housing into an inner compartment communicating with the interior of the casing and an outer compartment communicating with the atmosphere, means providing an air passage between the two compartments, and an air impeller associated with the projecting end of the shaft and located in the outer compartment.

7. For use in an electric machine which includes a casing and a rotatable shaft within the casing and projecting therethrough at one end, means to clean air and to circulate the cleaned air through the interior of the casing including, a housing surrounding the projecting end of the shaft, means dividing the housing into an inner compartment communicating with the interior of the casing and an outer compartment communicating with the atmosphere, a conduit partially encircling the housing and opening at one end tangentially into the outer compartment and at the opposite end tangentially into the inner compartment, a dust discharge opening adjacent the last mentioned end of the conduit, and an air impeller associated with the projecting end of the shaft and located in the outer compartment.

8. In a combined air cleaner and blower, a substantially cylindrical housing, means dividing the housing longitudinally into two compartments, a conduit partially encircling the housing and opening tangentially at each end into one of the compartments, a dirt discharge opening adjacent the discharge end of the conduit, and means to circulate air through one of the compartments, the conduit, and into the other compartment.

9. The invention claimed in claim 8 in which said last-mentioned means includes a rotatable shaft within one of the compartments, and an air impeller on the shaft within the compartment.

In testimony whereof I affix my signature.

MARK L. BLAIR.